(12) United States Patent
Wen et al.

(10) Patent No.: US 9,800,140 B2
(45) Date of Patent: Oct. 24, 2017

(54) HIGH EFFICIENCY BRIDGELESS POWER FACTOR CORRECTION CONVERTER FOR CONVERTING INPUT ALTERNATING CURRENT INTO OUTPUT DIRECT CURRENT

(71) Applicant: DELTA ELECTRONICS, INC., Taoyuan County (TW)

(72) Inventors: Sheng-Yu Wen, Taoyuan County (TW); Cheng-Yi Lin, Taoyuan County (TW); Chien-Yu Lo, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 9 days.

(21) Appl. No.: 15/003,143

(22) Filed: Jan. 21, 2016

(65) Prior Publication Data

US 2017/0033681 A1    Feb. 2, 2017

(30) Foreign Application Priority Data

Jul. 29, 2015   (TW) .............................. 104124489 A

(51) Int. Cl.
    *H02M 1/42*    (2007.01)
(52) U.S. Cl.
    CPC ........... *H02M 1/4233* (2013.01); *H02M 1/42* (2013.01); *H02M 1/4208* (2013.01); *Y02B 70/126* (2013.01)
(58) Field of Classification Search
    CPC .................................................. H02M 1/4208
    See application file for complete search history.

(56) References Cited

U.S. PATENT DOCUMENTS

| 8,385,032 B1* | 2/2013 | Mao ..................... H02M 1/4225 361/111 |
| 2008/0002444 A1* | 1/2008 | Shekhawat ............. H02M 1/34 363/127 |
| 2013/0077365 A1 | 3/2013 | Chalermboon et al. | |
| 2015/0002108 A1* | 1/2015 | Kim ..................... H02M 1/4208 323/210 |

FOREIGN PATENT DOCUMENTS

JP           2013074667           4/2013

OTHER PUBLICATIONS

JP Office Action dated Feb. 7, 2017, from corresponding application No. JP 2016-012915.

* cited by examiner

*Primary Examiner* — Jue Zhang
*Assistant Examiner* — Trinh Dang
(74) *Attorney, Agent, or Firm* — Hauptman Ham, LLP

(57) ABSTRACT

A high efficiency bridgeless power factor correction converter includes a power factor correction control unit, a first switch, a second switch, a third switch, a fourth switch, a fifth switch, a sixth switch, a first inductor, a second inductor and a bulk capacitor. The power factor correction control unit is configured to turn on or turn off the first switch, the second switch, the third switch, the fourth switch, the fifth switch and the sixth switch, so that the high efficiency bridgeless power factor correction converter converts an input alternating current voltage into an output direct current voltage.

9 Claims, 3 Drawing Sheets

HIGH EFFICIENCY BRIDGELESS POWER FACTOR CORRECTION CONVERTER FOR CONVERTING INPUT ALTERNATING CURRENT INTO OUTPUT DIRECT CURRENT

BACKGROUND OF THE INVENTION

Field of the Invention

The present invention relates to a bridgeless power factor correction converter, and especially relates to a high efficiency bridgeless power factor correction converter applied to a low input voltage.

Description of the Related Art

Comparing with the power factor correction converter having the bridge rectifier, the bridgeless power factor correction converter is an improved power factor correction converter. Therefore, the power factor correction converter having the bridge rectifier is replaced by the bridgeless power factor correction converter gradually. However, comparing with the power factor correction converter having the bridge rectifier, the user has to pay more attention to the suppression of the common-mode noise of the bridgeless power factor correction converter.

No matter the power factor correction converter having the bridge rectifier or the bridgeless power factor correction converter is used, when it is applied to the low input voltage or the high power, because the input current is greater, the diodes of the power factor correction converter will generate more power loss, such that the overall efficiency of the power factor correction converter is decreased.

SUMMARY OF THE INVENTION

In order to solve the above-mentioned problems, an object of the present invention is to provide a high efficiency bridgeless power factor correction converter.

In order to achieve the object of the present invention mentioned above, the high efficiency bridgeless power factor correction converter comprises a first inductor, a second inductor, a bulk capacitor, a first switch, a second switch, a third switch, a fourth switch, a fifth switch, a sixth switch and a power factor correction control unit. The first inductor is coupled to a first side of an alternating current voltage supply apparatus. The second inductor is coupled to a second side of the alternating current voltage supply apparatus. The bulk capacitor has a positive side and a negative side. The first switch has a first side and a second side. The first side of the first switch is coupled to the first inductor. The second side of the first switch is coupled to the negative side of the bulk capacitor. The second switch has a first side and a second side. The first side of the second switch is coupled to the positive side of the bulk capacitor. The second side of the second switch is coupled to the first inductor and the first switch. The third switch has a first side and a second side. The first side of the third switch is coupled to the second inductor. The second side of the third switch is coupled to the negative side of the bulk capacitor. The fourth switch has a first side and a second side. The first side of the fourth switch is coupled to the positive side of the bulk capacitor and the second switch. The second side of the fourth switch is coupled to the second inductor and the third switch. The fifth switch has a first side and a second side. The first side of the fifth switch is coupled to the second side of the alternating current voltage supply apparatus. The second side of the fifth switch is coupled to the negative side of the bulk capacitor. The sixth switch has a first side and a second side. The first side of the sixth switch is coupled to the first side of the alternating current voltage supply apparatus. The second side of the sixth switch is coupled to the negative side of the bulk capacitor. The power factor correction control unit is electrically connected to the first switch, the second switch, the third switch, the fourth switch, the fifth switch and the sixth switch. The power factor correction control unit turns on or turns off the first switch, the second switch, the third switch, the fourth switch, the fifth switch and the sixth switch, so that the high efficiency bridgeless power factor correction converter converts an input alternating current voltage provided by the alternating current voltage supply apparatus into an output direct current voltage.

Moreover, when the input alternating current voltage is in a positive half cycle, the power factor correction control unit turns on the first switch and the fifth switch, but turns off the second switch, the third switch, the fourth switch and the sixth switch, so that the first inductor stores energy.

Moreover, when the power factor correction control unit turns off the first switch and turns on the second switch, the first inductor charges the bulk capacitor.

Moreover, when the input alternating current voltage is in a negative half cycle, the power factor correction control unit turns on the third switch and the sixth switch, but turns off the first switch, the second switch, the fourth switch and the fifth switch, so that the second inductor stores energy.

Moreover, when the power factor correction control unit turns off the third switch and turns on the fourth switch, the second inductor charges the bulk capacitor.

Moreover, the power factor correction control unit comprises a power factor correction driver, a first complementation driver and a second complementation driver. The power factor correction driver generates a pulse width modulation signal. The first complementation driver receives the pulse width modulation signal and generates a first modulation signal and a second modulation signal. The second complementation driver receives the pulse width modulation signal and generates a third modulation signal and a fourth modulation signal. The first modulation signal and the second modulation signal are complementary. The third modulation signal and the fourth modulation signal are complementary.

Moreover, the power factor correction control unit further comprises a first AND gate, a second AND gate, a third AND gate and a fourth AND gate. According to a first alternating current detection signal and the first modulation signal, the first AND gate generates a first switch control signal. According to the first alternating current detection signal and the second modulation signal, the second AND gate generates a second switch control signal. According to a second alternating current detection signal and the third modulation signal, the third AND gate generates a third switch control signal. According to the second alternating current detection signal and the fourth modulation signal, the fourth AND gate generates a fourth switch control signal. When the input alternating current voltage is in a positive half cycle, the first alternating current detection signal is high-level, and the second alternating current detection signal is low-level. When the input alternating current voltage is in a negative half cycle, the second alternating current detection signal is high-level, and the first alternating current detection signal is low-level.

Moreover, the power factor correction control unit further comprises a first switch driver and a second switch driver. The first switch driver is electrically connected to the first switch and the second switch. The second switch driver is electrically connected to the third switch and the fourth switch. According to the first switch control signal and the second switch control signal, the first switch driver drives the first switch and the second switch respectively. According to the third switch control signal and the fourth switch control signal, the second switch driver drives the third switch and the fourth switch respectively.

Moreover, the power factor correction control unit further comprises a third switch driver electrically connected to the fifth switch and the sixth switch. According to the first alternating current detection signal and the second alternating current detection signal, the third switch driver drives the fifth switch and the sixth switch respectively.

Moreover, the high efficiency bridgeless power factor correction converter further comprises a first current sensor, a second current sensor and a third current sensor. The first current sensor is electrically connected to the first switch, the first inductor, the power factor correction control unit and the second switch. The second current sensor is electrically connected to the third switch, the second inductor, the power factor correction control unit and the fourth switch. The third current sensor is electrically connected to the second switch, the fourth switch and the bulk capacitor.

The advantage of the present invention is to provide a bridgeless power factor correction converter comprising six switches, so that the power loss is less and the common-mode noise is suppressed.

DETAILED DESCRIPTION OF THE INVENTION

Please refer to following detailed description and figures for the technical content of the present invention. The following detailed description and figures are referred for the present invention, but the present invention is not limited to it.

Figure 1:
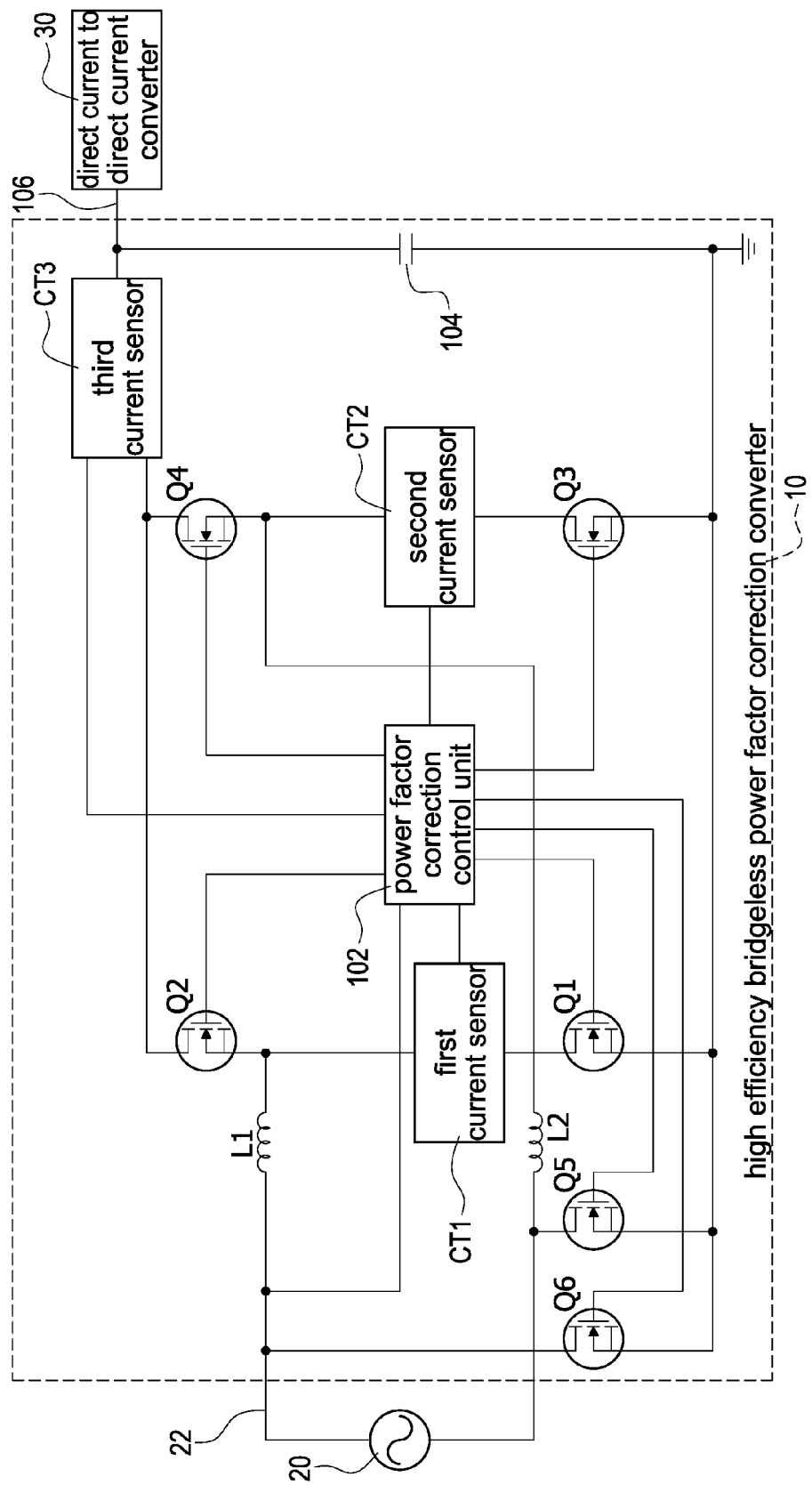
FIG. 1 shows a block diagram of the high efficiency bridgeless power factor correction converter of the present invention.

FIG. 1 shows a block diagram of the high efficiency bridgeless power factor correction converter of the present invention. A high efficiency bridgeless power factor correction converter 10 comprises a power factor correction control unit 102, a first switch Q1, a second switch Q2, a third switch Q3, a fourth switch Q4, a fifth switch Q5, a sixth switch Q6, a first inductor L1, a second inductor L2, a bulk capacitor 104, a first current sensor CT1, a second current sensor CT2 and a third current sensor CT3.

The first inductor L1 is coupled to a first side of an alternating current voltage supply apparatus 20. The second inductor L2 is coupled to a second side of the alternating current voltage supply apparatus 20. The bulk capacitor 104 comprises a positive side and a negative side. The first switch Q1 comprises a first side and a second side. The first side of the first switch Q1 is coupled to the first inductor L1. The second side of the first switch Q1 is coupled to the negative side of the bulk capacitor 104. The second switch Q2 comprises a first side and a second side. The first side of the second switch Q2 is coupled to the positive side of the bulk capacitor 104. The second side of the second switch Q2 is coupled to the first inductor L1 and the first switch Q1. The third switch Q3 comprises a first side and a second side. The first side of the third switch Q3 is coupled to the second inductor L2. The second side of the third switch Q3 is coupled to the negative side of the bulk capacitor 104. The fourth switch Q4 comprises a first side and a second side. The first side of the fourth switch Q4 is coupled to the positive side of the bulk capacitor 104 and the second switch Q2. The second side of the fourth switch Q4 is coupled to the second inductor L2 and the third switch Q3. The fifth switch Q5 comprises a first side and a second side. The first side of the fifth switch Q5 is coupled to the second side of the alternating current voltage supply apparatus 20. The second side of the fifth switch Q5 is coupled to the negative side of the bulk capacitor 104. The sixth switch Q6 comprises a first side and a second side. The first side of the sixth switch Q6 is coupled to the first side of the alternating current voltage supply apparatus 20. The second side of the sixth switch Q6 is coupled to the negative side of the bulk capacitor 104. The power factor correction control unit 102 is electrically connected to the first switch Q1, the second switch Q2, the third switch Q3, the fourth switch Q4, the fifth switch Q5 and the sixth switch Q6. The first current sensor CT1 is electrically connected to the first switch Q1, the first inductor L1, the power factor correction control unit 102 and the second switch Q2. The second current sensor CT2 is electrically connected to the third switch Q3, the second inductor L2, the power factor correction control unit 102 and the fourth switch Q4. The third current sensor CT3 is electrically connected to the second switch Q2, the fourth switch Q4 and the bulk capacitor 104.

The power factor correction control unit 102 turns on or turns off the first switch Q1, the second switch Q2, the third switch Q3, the fourth switch Q4, the fifth switch Q5 and the sixth switch Q6, so that the high efficiency bridgeless power factor correction converter 10 converts an input alternating current voltage 22 provided by the alternating current voltage supply apparatus 20 into an output direct current voltage 106.

In another word, the high efficiency bridgeless power factor correction converter 10 is applied to the alternating current voltage supply apparatus 20 and a direct current to direct current converter 30. The alternating current voltage supply apparatus 20 sends the input alternating current voltage 22 to the high efficiency bridgeless power factor correction converter 10. The power factor correction control unit 102 turns on or turns off the first switch Q1, the second switch Q2, the third switch Q3, the fourth switch Q4, the fifth switch Q5 and the sixth switch Q6, so that the high efficiency bridgeless power factor correction converter 10 converts the input alternating current voltage 22 into the output direct current voltage 106. The high efficiency bridgeless power factor correction converter 10 sends the output direct current voltage 106 to the direct current to direct current converter 30. The content mentioned above will be described as following.

When the input alternating current voltage 22 is in a positive half cycle, the power factor correction control unit 102 turns on the first switch Q1 and the fifth switch Q5, but turns off the second switch Q2, the third switch Q3, the fourth switch Q4 and the sixth switch Q6, so that the first inductor L1 stores energy. In an energy-releasing stage, when the power factor correction control unit 102 turns off the first switch Q1 and turns on the second switch Q2, energy stored in the first inductor L1 charges the bulk capacitor 104 through the second switch Q2. In the energy-releasing stage, the third switch Q3, the fourth switch Q4 and the sixth switch Q6 are still turned off, and the fifth switch Q5 is still turned on. In the overall positive half cycle, the fifth switch Q5 is turned on, so that the negative side of the bulk capacitor 104 is always connected to the input alternating current voltage 22 to suppress the common-mode noise.

When the input alternating current voltage 22 is in a negative half cycle, the power factor correction control unit 102 turns on the third switch Q3 and the sixth switch Q6, but turns off the first switch Q1, the second switch Q2, the fourth switch Q4 and the fifth switch Q5, so that the second inductor L2 stores energy. In the energy-releasing stage, when the power factor correction control unit 102 turns off the third switch Q3 and turns on the fourth switch Q4, energy stored in the second inductor L2 charges the bulk capacitor 104 through the fourth switch Q4. In the energy-releasing stage, the first switch Q1, the second switch Q2 and the fifth switch Q5 are still turned off, and the sixth switch Q6 is still turned on. In the overall negative half cycle, the sixth switch Q6 is turned on, so that the negative side of the bulk capacitor 104 is always connected to the input alternating current voltage 22 to suppress the common-mode noise.

Moreover, the high efficiency bridgeless power factor correction converter 10 sending the output direct current voltage 106 to the direct current to direct current converter 30 through the bulk capacitor 104 is a prior art and is omitted here for brevity.

In conclusion, the following table is obtained, wherein these components are shown as the symbols:

|  | in the positive half cycle | | in the negative half cycle | |
| --- | --- | --- | --- | --- |
| Q1 | turned on | turned off | turned off | turned off |
| Q2 | turned off | turned on | turned off | turned off |
| Q3 | turned off | turned off | turned on | turned off |
| Q4 | turned off | turned off | turned off | turned on |
| Q5 | turned on | turned on | turned off | turned off |
| Q6 | turned off | turned off | turned on | turned on |
| result | L1 stores energy | L1 releases energy | L2 stores energy | L2 releases energy |

Moreover, the first switch Q1, the second switch Q2, the third switch Q3, the fourth switch Q4, the fifth switch Q5 and the sixth switch Q6 are, for example but not limited to, metal oxide semiconductor field effect transistors. The first current sensor CT1, the second current sensor CT2 and the third current sensor CT3 are, for example but not limited to, current transformers for detecting currents, so that the power factor correction control unit 102 controls the switches to achieve the efficiency of power factor correction.

The advantage of the present invention is to provide a bridgeless power factor correction converter comprising six switches, so that the power loss is less and the common-mode noise is suppressed.

Figure 2:
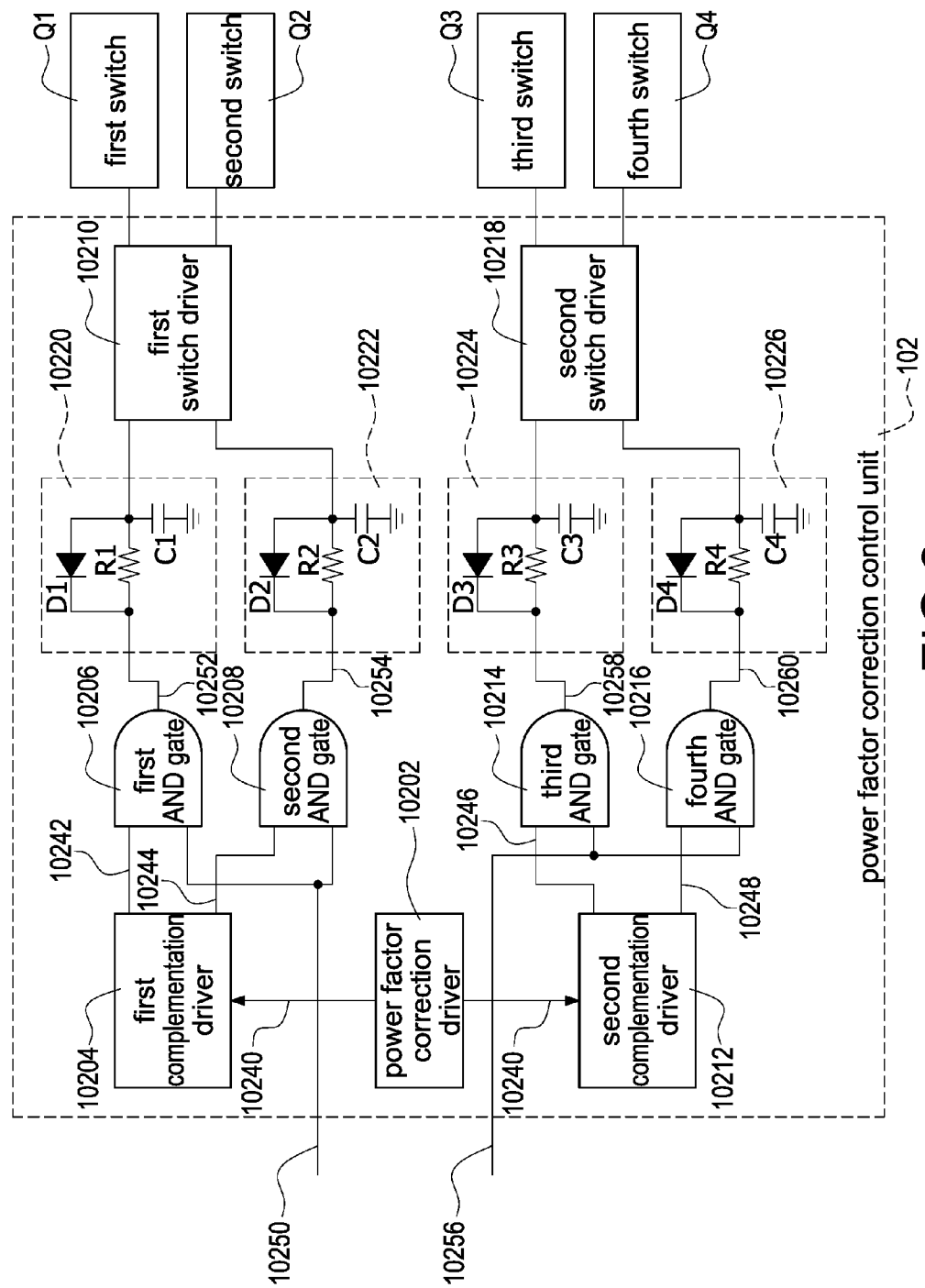
FIG. 2 shows a block diagram of one part of the power factor correction control unit of the present invention.

FIG. 2 shows a block diagram of one part of the power factor correction control unit of the present invention. The power factor correction control unit 102 comprises a power factor correction driver 10202 a first complementation driver 10204, a first AND gate 10206, a second AND gate 10208, a first switch driver 10210, a second complementation driver 10212, a third AND gate 10214, a fourth AND gate 10216, a second switch driver 10218, a first delay unit 10220, a second delay unit 10222, a third delay unit 10224 and a fourth delay unit 10226. The first delay unit 10220 comprises a first diode D1, a first resistor R1 and a first capacitor C1. The second delay unit 10222 comprises a second diode D2, a second resistor R2 and a second capacitor C2. The third delay unit 10224 comprises a third diode D3, a third resistor R3 and a third capacitor C3. The fourth delay unit 10226 comprises a fourth diode D4, a fourth resistor R4 and a fourth capacitor C4.

The first complementation driver 10204 is electrically connected to the power factor correction driver 10202. The first AND gate 10206 is electrically connected to the first complementation driver 10204, and is electrically connected to the alternating current voltage supply apparatus 20 through proper circuits (will be described in details later). The second AND gate 10208 is electrically connected to the first complementation driver 10204 and the first AND gate 10206, and is electrically connected to the alternating current voltage supply apparatus 20 through proper circuits (will be described in details later). The first switch driver 10210 is electrically connected to the first AND gate 10206, the second AND gate 10208, the first switch Q1 and the second switch Q2. The second complementation driver 10212 is electrically connected to the power factor correction driver 10202. The third AND gate 10214 is electrically connected to the second complementation driver 10212, and is electrically connected to the alternating current voltage supply apparatus 20 through proper circuits (will be described in details later). The fourth AND gate 10216 is electrically connected to the second complementation driver 10212 and the third AND gate 10214, and is electrically connected to the alternating current voltage supply apparatus 20 through proper circuits (will be described in details later). The second switch driver 10218 is electrically connected to the third AND gate 10214, the fourth AND gate 10216, the third switch Q3 and the fourth switch Q4. The first delay unit 10220 is electrically connected to the first AND gate 10206 and the first switch driver 10210. The second delay unit 10222 is electrically connected to the second AND gate 10208 and the first switch driver 10210. The third delay unit 10224 is electrically connected to the third AND gate 10214 and the second switch driver 10218. The fourth delay unit 10226 is electrically connected to the fourth AND gate 10216 and the second switch driver 10218. The first diode D1 is electrically connected to the first AND gate 10206 and the first switch driver 10210. The first resistor R1 is electrically connected to the first AND gate 10206, the first switch driver 10210 and the first diode D1. The first capacitor C1 is electrically connected to the first switch driver 10210, the first diode D1 and the first resistor R1. The second diode D2 is electrically connected to the second AND gate 10208 and the first switch driver 10210. The second resistor R2 is electrically connected to the second AND gate 10208, the first switch driver 10210 and the second diode D2. The second capacitor C2 is electrically connected to the first switch driver 10210, the second diode D2 and the second resistor R2. The third diode D3 is electrically connected to the third AND gate 10214 and the second switch driver 10218. The third resistor R3 is electrically connected to the third AND gate 10214, the second switch driver 10218 and the third diode D3. The third capacitor C3 is electrically connected to the second switch driver 10218, the third diode D3 and the third resistor R3. The fourth diode D4 is electrically connected to the fourth AND gate 10216 and the second switch driver 10218. The fourth resistor R4 is electrically connected to the fourth AND gate 10216, the second switch driver 10218 and the fourth diode D4. The fourth capacitor C4 is electrically connected to the second switch driver 10218, the fourth diode D4 and the fourth resistor R4.

The power factor correction driver 10202 generates a pulse width modulation signal 10240. The first complementation driver 10204 receives the pulse width modulation signal 10240 and generates a first modulation signal 10242 and a second modulation signal 10244. The second complementation driver 10212 receives the pulse width modulation signal 10240 and generates a third modulation signal 10246 and a fourth modulation signal 10248. The first modulation signal 10242 and the second modulation signal 10244 are complementary. The third modulation signal 10246 and the fourth modulation signal 10248 are complementary.

According to a first alternating current detection signal 10250 and the first modulation signal 10242, the first AND gate 10206 generates a first switch control signal 10252. According to the first alternating current detection signal 10250 and the second modulation signal 10244, the second AND gate 10208 generates a second switch control signal 10254. According to a second alternating current detection signal 10256 and the third modulation signal 10246, the third AND gate 10214 generates a third switch control signal 10258. According to the second alternating current detection signal 10256 and the fourth modulation signal 10248, the fourth AND gate 10216 generates a fourth switch control signal 10260. When the input alternating current voltage 22 is in the positive half cycle, the first alternating current detection signal 10250 is high-level, and the second alternating current detection signal 10256 is low-level. When the input alternating current voltage 22 is in the negative half cycle, the second alternating current detection signal 10256 is high-level, and the first alternating current detection signal 10250 is low-level. Moreover, sources of the first alternating current detection signal 10250 and the second alternating current detection signal 10256 will be described later.

According to the first switch control signal 10252 and the second switch control signal 10254, the first switch driver 10210 drives the first switch Q1 and the second switch Q2 respectively. According to the third switch control signal 10258 and the fourth switch control signal 10260, the second switch driver 10218 drives the third switch Q3 and the fourth switch Q4 respectively.

The purpose of FIG. 2 is to describe how the power factor correction control unit 102 mentioned above turns on or turns off the first switch Q1, the second switch Q2, the third switch Q3 and the fourth switch Q4. Please refer to the table mentioned above as well.

More specifically, when the input alternating current voltage 22 is in the positive half cycle and the first inductor L1 stores energy, the power factor correction driver 10202 turns on the first switch Q1 through the first complementation driver 10204, the first AND gate 10206, the first delay unit 10220 and the first switch driver 10210.

When the input alternating current voltage 22 is in the positive half cycle and the first inductor L1 releases energy, the power factor correction driver 10202 turns on the second switch Q2 through the first complementation driver 10204, the second AND gate 10208, the second delay unit 10222 and the first switch driver 10210.

When the input alternating current voltage 22 is in the negative half cycle and the second inductor L2 stores energy, the power factor correction driver 10202 turns on the third switch Q3 through the second complementation driver 10212, the third AND gate 10214, the third delay unit 10224 and the second switch driver 10218.

When the input alternating current voltage 22 is in the negative half cycle and the second inductor L2 releases energy, the power factor correction driver 10202 turns on the fourth switch Q4 through the second complementation driver 10212, the fourth AND gate 10216, the fourth delay unit 10226 and the second switch driver 10218.

Moreover, the first delay unit 10220, the second delay unit 10222, the third delay unit 10224 and the fourth delay unit 10226 delay signal transmission time, so that dead time is generated to avoid the switches turning on at the same time (the switches turning on at the same time will result in short circuits).

Figure 3:
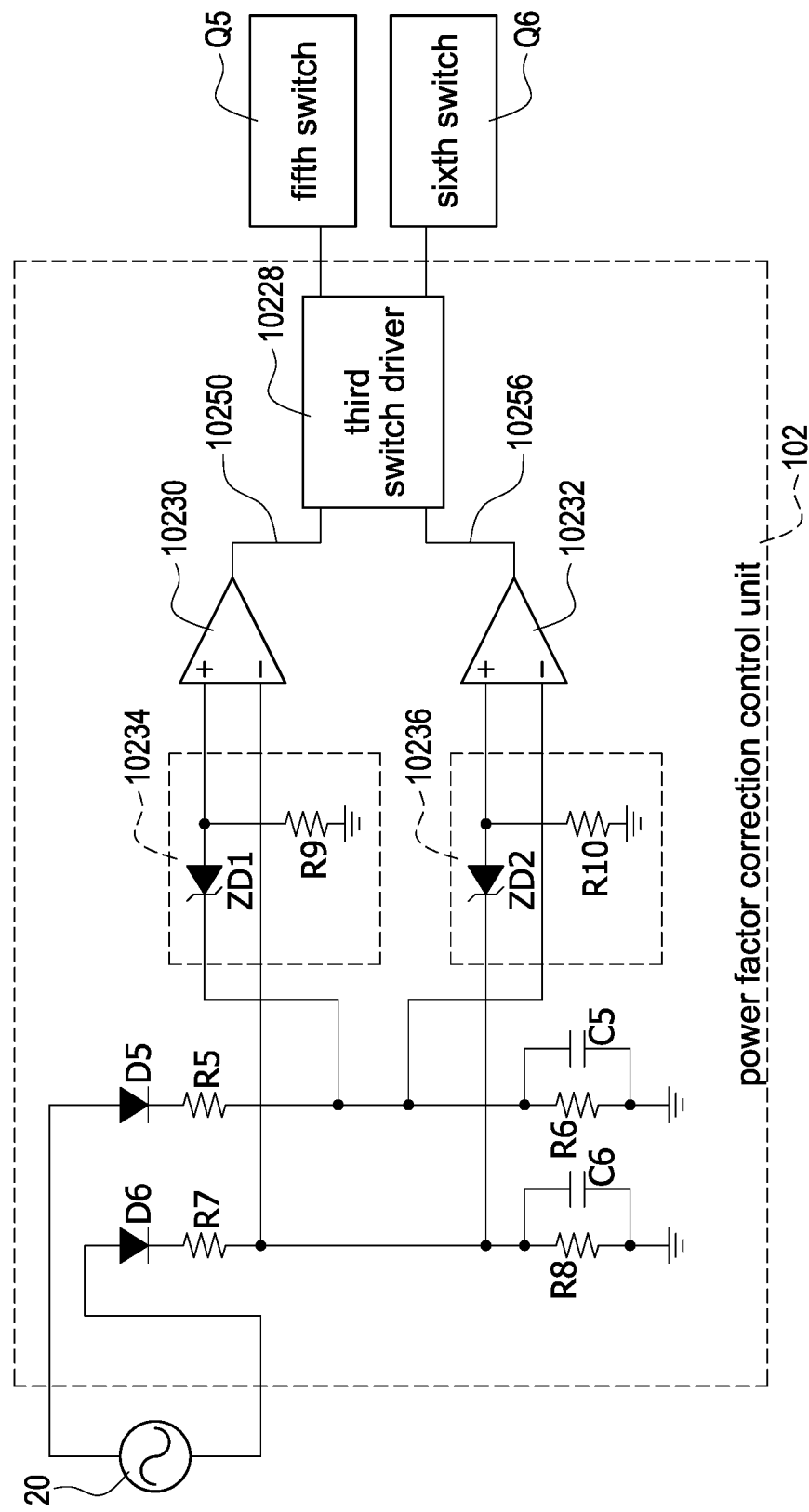
FIG. 3 shows a block diagram of the other part of the power factor correction control unit of the present invention.

FIG. 3 shows a block diagram of the other part of the power factor correction control unit of the present invention. The power factor correction control unit 102 further comprises a third switch driver 10228, a first comparator 10230, a second comparator 10232, a fifth delay unit 10234, a sixth delay unit 10236, a fifth diode D5, a fifth resistor R5, a sixth resistor R6, a fifth capacitor C5, a sixth diode D6, a seventh resistor R7, an eighth resistor R8 and a sixth capacitor C6. The fifth delay unit 10234 comprises a first Zener diode ZD1 and a ninth resistor R9. The sixth delay unit 10236 comprises a second Zener diode ZD2 and a tenth resistor R10.

The third switch driver 10228 is electrically connected to the fifth switch Q5 and the sixth switch Q6. The first comparator 10230 is electrically connected to the third switch driver 10228. The second comparator 10232 is electrically connected to the third switch driver 10228 and the first comparator 10230. The fifth delay unit 10234 is electrically connected to the first comparator 10230 and the second comparator 10232. The sixth delay unit 10236 is electrically connected to the first comparator 10230 and the second comparator 10232. The fifth diode D5 is electrically connected to the alternating current voltage supply apparatus 20. The fifth resistor R5 is electrically connected to the fifth diode D5, the fifth delay unit 10234 and the second comparator 10232. The sixth resistor R6 is electrically connected to the fifth delay unit 10234, the second comparator 10232 and the fifth resistor R5. The fifth capacitor C5 is electrically connected to the fifth delay unit 10234, the second comparator 10232, the fifth resistor R5 and the sixth resistor R6. The sixth diode D6 is electrically connected to the alternating current voltage supply apparatus 20. The seventh resistor R7 is electrically connected to the sixth diode D6, the first comparator 10230 and the sixth delay unit 10236. The eighth resistor R8 is electrically connected to the first comparator 10230, the sixth delay unit 10236 and the seventh resistor R7. The sixth capacitor C6 is electrically connected to the first comparator 10230, the sixth delay unit 10236, the seventh resistor R7 and the eighth resistor R8. The first Zener diode ZD1 is electrically connected to the first comparator 10230, the fifth resistor R5, the second comparator 10232, the sixth resistor R6 and the fifth capacitor C5. The ninth resistor R9 is electrically connected to the first comparator 10230 and the first Zener diode ZD1. The second Zener diode ZD2 is electrically connected to the second comparator 10232, the seventh resistor R7, the first comparator 10230, the eighth resistor R8 and the sixth capacitor C6. The tenth resistor R10 is electrically connected to the second comparator 10232 and the second Zener diode ZD2.

The purpose of FIG. 3 is to describe how the power factor correction control unit 102 mentioned above turns on or turns off the fifth switch Q5 and the sixth switch Q6. Please refer to the table mentioned above as well. According to the first alternating current detection signal 10250 and the second alternating current detection signal 10256, the third switch driver 10228 drives the fifth switch Q5 and the sixth switch Q6 respectively.

When the input alternating current voltage 22 is in the positive half cycle, according to the components shown in FIG. 3, the power factor correction control unit 102 turns on the fifth switch Q5 but turns off the sixth switch Q6. When the input alternating current voltage 22 is in the negative half cycle, according to the components shown in FIG. 3, the power factor correction control unit 102 turns on the sixth switch Q6 but turns off the fifth switch Q5. The fifth delay unit 10234 and the sixth delay unit 10236 delay signal transmission time, so that dead time is generated to avoid the switches turning on at the same time (the switches turning on at the same time will result in short circuits).

Moreover, in an embodiment but not limited to, the drivers mentioned above are conventional drivers. The present invention utilizes the conventional drivers to easily control the six switches of the present invention. The first alternating current detection signal 10250 and the second alternating current detection signal 10256 shown in FIG. 2 are achieved by the components shown in FIG. 3 (comprising the first comparator 10230, the second comparator 10232, the fifth delay unit 10234, the sixth delay unit 10236, the fifth diode D5, the sixth diode D6, the fifth resistor R5, the sixth resistor R6, the seventh resistor R7, the eighth resistor R8, the fifth capacitor C5 and the sixth capacitor C6) connecting to the alternating current voltage supply apparatus 20. But the present invention is not limited to it.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A high efficiency bridgeless power factor correction converter comprising:
   a first inductor coupled to a first side of an alternating current voltage supply apparatus;
   a second inductor coupled to a second side of the alternating current voltage supply apparatus;
   a bulk capacitor having a positive side and a negative side;
   a first switch having a first side and a second side, the first side of the first switch coupled to the first inductor, the second side of the first switch coupled to the negative side of the bulk capacitor;
   a second switch having a first side and a second side, the first side of the second switch coupled to the positive side of the bulk capacitor, the second side of the second switch coupled to the first inductor and the first switch;
   a third switch having a first side and a second side, the first side of the third switch coupled to the second inductor, the second side of the third switch coupled to the negative side of the bulk capacitor;
   a fourth switch having a first side and a second side, the first side of the fourth switch coupled to the positive side of the bulk capacitor and the second switch, the second side of the fourth switch coupled to the second inductor and the third switch;
   a fifth switch having a first side and a second side, the first side of the fifth switch coupled to the second side of the alternating current voltage supply apparatus, the second side of the fifth switch coupled to the negative side of the bulk capacitor;
   a sixth switch having a first side and a second side, the first side of the sixth switch coupled to the first side of the alternating current voltage supply apparatus, the second side of the sixth switch coupled to the negative side of the bulk capacitor; and
   a power factor correction control unit electrically connected to the first switch, the second switch, the third switch, the fourth switch, the fifth switch and the sixth switch,
   wherein
   the power factor correction control unit turns on or turns off the first switch, the second switch, the third switch, the fourth switch, the fifth switch and the sixth switch, so that the high efficiency bridgeless power factor correction converter converts an input alternating current voltage provided by the alternating current voltage supply apparatus into an output direct current voltage, and
   when the input alternating current voltage is in a positive half cycle, the power factor correction control unit turns on the first switch and the fifth switch, but turns off the second switch, the third switch, the fourth switch and the sixth switch, so that the first inductor stores energy.

2. The high efficiency bridgeless power factor correction converter in claim 1, wherein when the power factor correction control unit turns off the first switch and turns on the second switch, the first inductor charges the bulk capacitor.

3. The high efficiency bridgeless power factor correction converter in claim 1, wherein when the input alternating current voltage is in a negative half cycle, the power factor correction control unit turns on the third switch and the sixth switch, but turns off the first switch, the second switch, the fourth switch and the fifth switch, so that the second inductor stores energy.

4. The high efficiency bridgeless power factor correction converter in claim 1, wherein the power factor correction control unit comprises:
   a power factor correction driver generating a pulse width modulation signal;
   a first complementation driver receiving the pulse width modulation signal and generating a first modulation signal and a second modulation signal; and
   a second complementation driver receiving the pulse width modulation signal and generating a third modulation signal and a fourth modulation signal,
   wherein the first modulation signal and the second modulation signal are complementary; the third modulation signal and the fourth modulation signal are complementary.

5. The high efficiency bridgeless power factor correction converter in claim 1, further comprising:
   a first current sensor electrically connected to the first switch, the first inductor, the power factor correction control unit and the second switch;
   a second current sensor electrically connected to the third switch, the second inductor, the power factor correction control unit and the fourth switch; and
   a third current sensor electrically connected to the second switch, the fourth switch and the bulk capacitor.

6. The high efficiency bridgeless power factor correction converter in claim 3, wherein when the power factor correction control unit turns off the third switch and turns on the fourth switch, the second inductor charges the bulk capacitor.

7. The high efficiency bridgeless power factor correction converter in claim 4, wherein the power factor correction control unit further comprises:
   a first and gate, according to a first alternating current detection signal and the first modulation signal, the first and gate generating a first switch control signal;

a second and gate, according to the first alternating current detection signal and the second modulation signal, the second and gate generating a second switch control signal;

a third and gate, according to a second alternating current detection signal and the third modulation signal, the third and gate generating a third switch control signal; and a fourth and gate, according to the second alternating current detection signal and the fourth modulation signal, the fourth and gate generating a fourth switch control signal, wherein when the input alternating current voltage is in the positive half cycle, the first alternating current detection signal is high-level, and the second alternating current detection signal is low-level; when the input alternating current voltage is in a negative half cycle, the second alternating current detection signal is high-level, and the first alternating current detection signal is low-level.

8. The high efficiency bridgeless power factor correction converter in claim 7, wherein the power factor correction control unit further comprises:

a first switch driver electrically connected to the first switch and the second switch; and a second switch driver electrically connected to the third switch and the fourth switch, wherein according to the first switch control signal and the second switch control signal, the first switch driver drives the first switch and the second switch respectively; according to the third switch control signal and the fourth switch control signal, the second switch driver drives the third switch and the fourth switch respectively.

9. The high efficiency bridgeless power factor correction converter in claim 8, wherein the power factor correction control unit further comprises:

a third switch driver electrically connected to the fifth switch and the sixth switch, wherein according to the first alternating current detection signal and the second alternating current detection signal, the third switch driver drives the fifth switch and the sixth switch respectively.

\* \* \* \* \*